(12) United States Patent  
Barber

(10) Patent No.: US 12,121,181 B2
(45) Date of Patent: Oct. 22, 2024

(54) OVEN APPLIANCE AND RACK ASSEMBLY

(71) Applicant: Haier US Appliance Solutions, Inc., Wilmington, DE (US)

(72) Inventor: Philip Ames Barber, Louisville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 696 days.

(21) Appl. No.: 17/381,709

(22) Filed: Jul. 21, 2021

(65) Prior Publication Data

US 2023/0027208 A1 Jan. 26, 2023

(51) Int. Cl.
*F24C 15/16* (2006.01)
*A47J 37/06* (2006.01)

(52) U.S. Cl.
CPC ........... *A47J 37/0694* (2013.01); *F24C 15/16* (2013.01); *F24C 15/168* (2013.01)

(58) Field of Classification Search
CPC ................................ F24C 15/16; F24C 15/36
USPC ........................................ 126/337 R; 211/183
See application file for complete search history.

(56) References Cited

U.S. PATENT DOCUMENTS

| | | | | |
|---|---|---|---|---|
| 980,680 | A * | 1/1911 | Ross ......................... | F24C 15/08 |
| | | | | 126/275 R |
| 1,139,445 | A * | 5/1915 | Pierce ...................... | A47J 37/10 |
| | | | | 99/422 |
| 1,787,022 | A * | 12/1930 | Seeley ..................... | F24C 15/16 |
| | | | | D7/354 |
| 2,006,385 | A * | 7/1935 | Dikeman ................. | F24C 15/16 |
| | | | | 126/41 R |
| 2,014,216 | A * | 9/1935 | Wheeler ................. | A21B 3/155 |
| | | | | 160/237 |
| 2,040,996 | A * | 5/1936 | Hungerford ............ | F24C 15/16 |
| | | | | 99/422 |
| 3,211,082 | A * | 10/1965 | Sachnoff ................. | F24C 15/16 |
| | | | | 126/39 M |
| 4,455,925 | A * | 6/1984 | Handal .................... | A21B 3/15 |
| | | | | 126/39 M |
| 5,558,237 | A * | 9/1996 | Ancona ................... | A21B 3/135 |
| | | | | 211/133.2 |
| 5,597,077 | A * | 1/1997 | Hartmann ............. | A47F 5/0056 |
| | | | | 211/183 |
| 5,697,302 | A * | 12/1997 | Putnam .................. | A47B 55/02 |
| | | | | 108/90 |
| 6,121,584 | A | 9/2000 | Key | |
| 7,342,203 | B2 | 3/2008 | Benoit | |
| 9,648,974 | B1 * | 5/2017 | Lagsdin .................. | A47J 27/00 |
| 10,634,362 | B2 | 4/2020 | Neal | |
| 2002/0170870 | A1 * | 11/2002 | Callis ..................... | A47B 96/02 |
| | | | | 211/183 |

(Continued)

FOREIGN PATENT DOCUMENTS

CN 208002666 U 10/2018

*Primary Examiner* — Jorge A Pereiro
(74) *Attorney, Agent, or Firm* — Dority & Manning, P.A.

(57) ABSTRACT

An oven appliance or rack assembly may include a rack frame and a non-permeable cook plate. The rack frame may extend along a transverse direction between a front end and a rear end. The rack frame may define a permeable support surface. The non-permeable cook plate may be selectively disposed on the rack frame. The non-permeable cook plate may include a rear nose rotatably attached to the rack frame at the front end.

18 Claims, 4 Drawing Sheets

(56) References Cited

U.S. PATENT DOCUMENTS

| | | | |
|---|---|---|---|
| 2007/0095814 A1* | 5/2007 | Dunn | F24C 15/16 |
| | | | 219/400 |
| 2008/0041804 A1* | 2/2008 | Ward | A47F 5/01 |
| | | | 211/183 |
| 2009/0001037 A1* | 1/2009 | Wilcock | A47B 96/02 |
| | | | 211/119.003 |
| 2009/0071464 A1* | 3/2009 | Dunn | A47B 55/02 |
| | | | 126/337 R |
| 2012/0067839 A1* | 3/2012 | Poisson | A47B 96/021 |
| | | | 211/1 |
| 2014/0190975 A1* | 7/2014 | Roylance | A21B 3/15 |
| | | | 220/573.1 |
| 2014/0216268 A1* | 8/2014 | Burch | A23B 4/0523 |
| | | | 99/352 |
| 2015/0076158 A1* | 3/2015 | Tingley | A21B 3/15 |
| | | | 220/573.4 |
| 2016/0220057 A1* | 8/2016 | Smith | H05B 3/0076 |
| 2017/0020286 A1* | 1/2017 | Pierson | A47B 96/021 |
| 2017/0089590 A1* | 3/2017 | Bruin-Slot | F24C 15/166 |
| 2019/0116977 A1* | 4/2019 | Lindblom | A47B 96/021 |
| 2023/0148283 A1* | 5/2023 | Li | A47F 5/0018 |
| | | | 248/304 |
| 2023/0329481 A1* | 10/2023 | Chan | A47J 37/067 |

\* cited by examiner

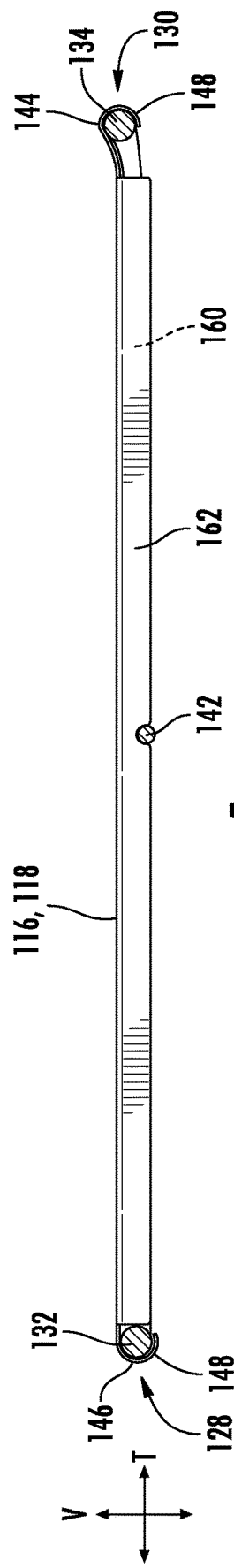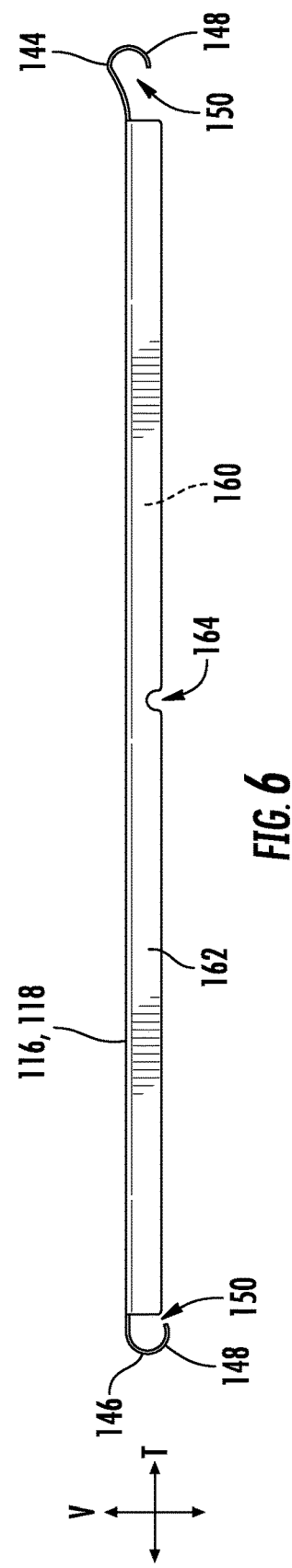

OVEN APPLIANCE AND RACK ASSEMBLY

FIELD OF THE INVENTION

The present subject matter relates generally to oven appliances, and more particularly to rack assemblies for the same.

BACKGROUND OF THE INVENTION

Conventional residential and commercial oven appliances generally include a cabinet that includes a cooking chamber for receipt of food items for cooking. Multiple gas or electric heating elements are positioned within the cabinet for heating the cooking chamber to cook food items located therein. The heating elements can include, for example, a bake heating assembly positioned at a bottom of the cooking chamber and a separate broiler heating assembly positioned at a top of the cooking chamber.

Typically, food or utensils for cooking are placed on wire racks within the cooking chamber and above the bake heating assembly. In some instances, protective or radiant plates are positioned over the bake heating assembly to protect the bake heating assembly or assist in evenly distributing heat across the bottom of the cooking chamber. Oftentimes, the wire racks are at least mounted well above a bake heating assembly to ensure the bake heating assembly is not damaged or a user does not accidentally contact the bake heating assembly. When the bake heating assembly is activated, heat from the bake heating assembly is thus forced to rise through an air gap, and any other intermediate elements, between the bake heating assembly and the wire rack before the utensil on the wire rack can be heated. Heat within the cooking chamber is relatively diffuse, and the temperature is generally consistent about the item or items on the rack.

Although these conventional configurations are useful for many types of foods, there are certain disadvantages. For instance, in many cases a vessel or container is required to hold one or more food items within a cooking chamber on a wire rack. Even with such vessels, some foods or liquids may spill from the vessel and fall through one or more wire racks to land within the cooking chamber, which can be difficult to clean. Additionally or alternatively, certain food items, such as pizzas or breads, may benefit from very high, localized (i.e., non-diffuse) heat for a relatively short amount of time. Some such cooking operations are commonly referred to as short-cycle cooking operations. Oftentimes, stone or specialized high-heat pans are placed onto one or more of the wire racks for trapping heat against the bottom of flat-breads or pizza. Such pans may be difficult to preheat or maintain a specific temperature desired by the user. For instance, the pans may be shaped or sized to be easily placed on and removed from a wide variety of wire racks (e.g., without removing a wire rack from the cooking chamber).

Separately from or in addition to the desirability for improved cooking performance of certain food items, many consumers prefer the usability or aesthetic advantages that come with a "hidden" bake feature wherein the bottom or bake heating assembly is hidden from view. Typically, such features require locating the bake heating assembly out of the cooking chamber and, instead, force heated air into the cooking chamber from a separate location. Although such configurations may provide an uncluttered arrangement that can be relatively easy to clean or keep the bake heating assembly from being inadvertently struck, these configurations may be difficult to assemble or degrade heating speed/performance within the cooking chamber. Preheating operations, in particular, may be especially slow using a hidden bake feature.

As a result, it would be useful to provide an oven appliance or assembly addressing one or more of the above issues. For instance, it may be advantageous to provide an oven appliance having one or more features for preventing spill on the walls or heating elements of the cooking chamber (e.g., without significantly degrading preheat performance). Additionally or alternatively, it may be advantageous to provide an oven appliance having one or more features for facilitating high, localized (i.e., non-diffuse) heat to food items within a cooking chamber.

BRIEF DESCRIPTION OF THE INVENTION

Aspects and advantages of the invention will be set forth in part in the following description, or may be obvious from the description, or may be learned through practice of the invention.

In one exemplary aspect of the present disclosure, a rack assembly for an oven appliance is provided. The rack assembly may include a rack frame and a non-permeable cook plate. The rack frame may extend along a transverse direction between a front end and a rear end. The rack frame may define a permeable support surface. The non-permeable cook plate may be selectively disposed on the rack frame. The non-permeable cook plate may include a rear nose rotatably attached to the rack frame at the front end.

In another exemplary aspect of the present disclosure, an oven appliance is provided. The oven appliance may include a cabinet, a rack frame, and a non-permeable cook plate. The cabinet may define a cooking chamber. The rack frame may be selectively disposed within the cooking chamber. The rack frame may extend along a transverse direction between a front end disposed proximal to an opening of the cooking chamber and a rear end disposed proximal to a back wall of the cooking chamber. The rack frame may define a permeable support surface. The non-permeable cook plate may be selectively disposed on the rack frame. The non-permeable cook plate may include a rear nose rotatably attached to the rack frame at the rear end.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

FIG. 5 provides a cross-sectional elevation view of the exemplary rack assembly of FIG. 3.

FIG. 6 provides an elevation view of a non-permeable cook plate of the exemplary rack assembly of FIG. 3.

DETAILED DESCRIPTION

Figure 1:
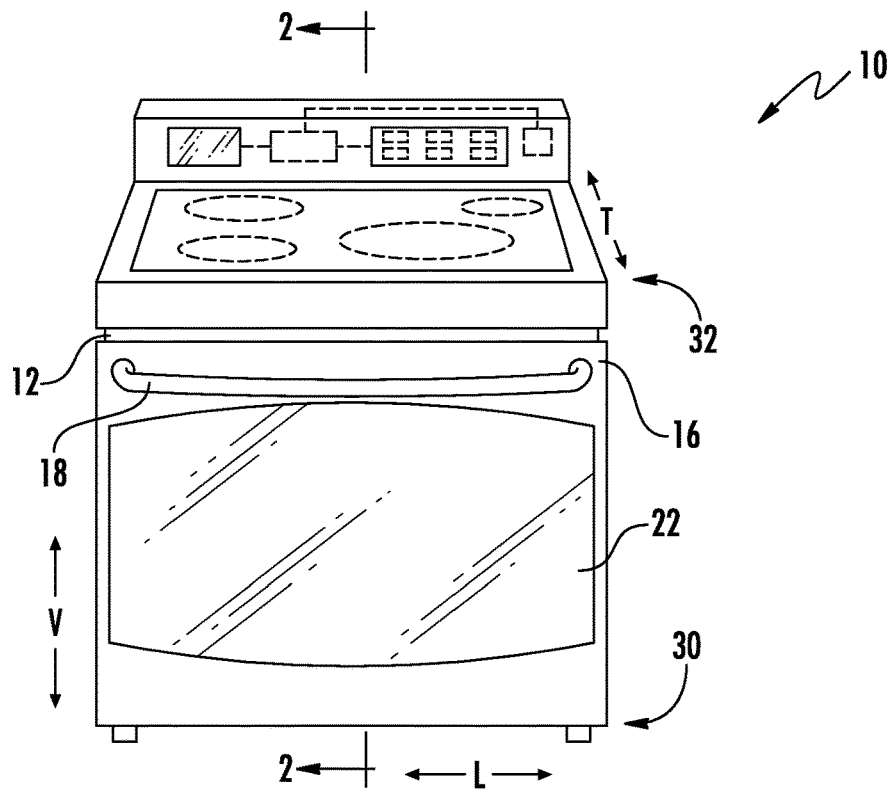
FIG. 1 provides a perspective view of an oven appliance according to exemplary embodiments of the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first," "second," and "third" may be used interchangeably to distinguish one component from another and are not intended to signify location or importance of the individual components. The terms "includes" and "including" are intended to be inclusive in a manner similar to the term "comprising." Similarly, the term "or" is generally intended to be inclusive (i.e., "A or B" is intended to mean "A or B or both"). In addition, here and throughout the specification and claims, range limitations may be combined or interchanged. Such ranges are identified and include all the sub-ranges contained therein unless context or language indicates otherwise. For example, all ranges disclosed herein are inclusive of the endpoints, and the endpoints are independently combinable with each other. The singular forms "a," "an," and "the" include plural references unless the context clearly dictates otherwise.

Approximating language, as used herein throughout the specification and claims, may be applied to modify any quantitative representation that could permissibly vary without resulting in a change in the basic function to which it is related. Accordingly, a value modified by a term or terms, such as "generally," "about," "approximately," and "substantially," are not to be limited to the precise value specified. In at least some instances, the approximating language may correspond to the precision of an instrument for measuring the value, or the precision of the methods or machines for constructing or manufacturing the components or systems. For example, the approximating language may refer to being within a 10 percent margin, i.e., including values within ten percent greater or less than the stated value.

Figure 2:
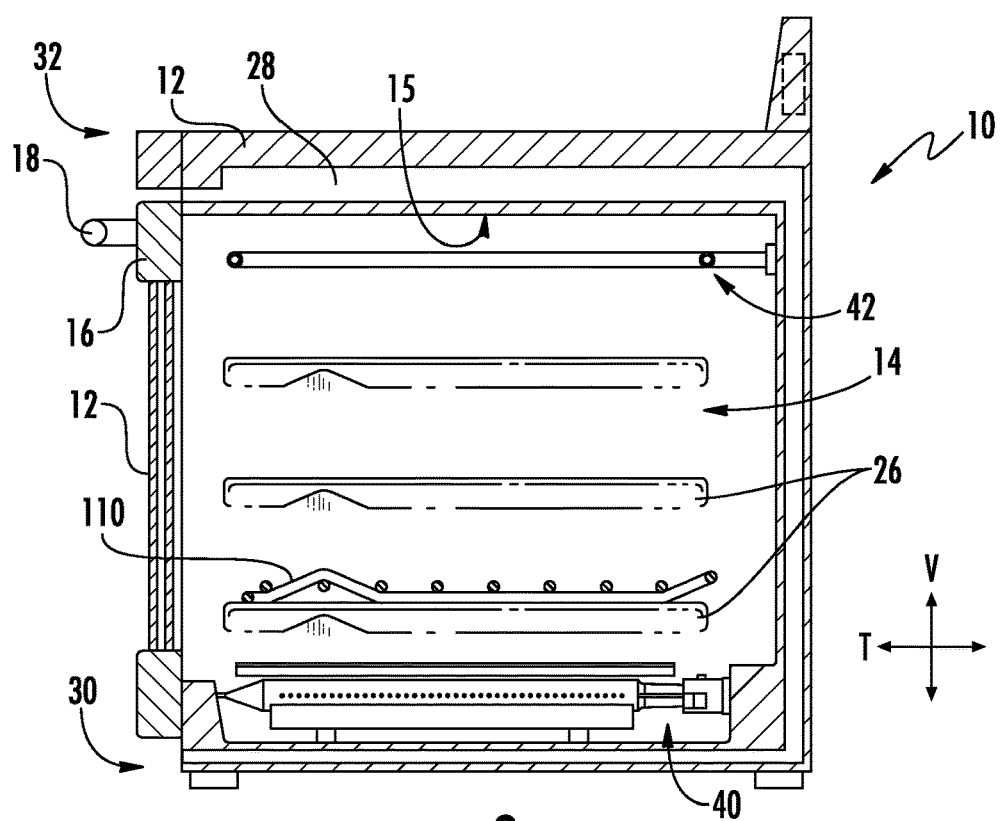
FIG. 2 provides a section view of the oven appliance of FIG. 1 taken along the 2-2 line of FIG. 1.
Figure 3:
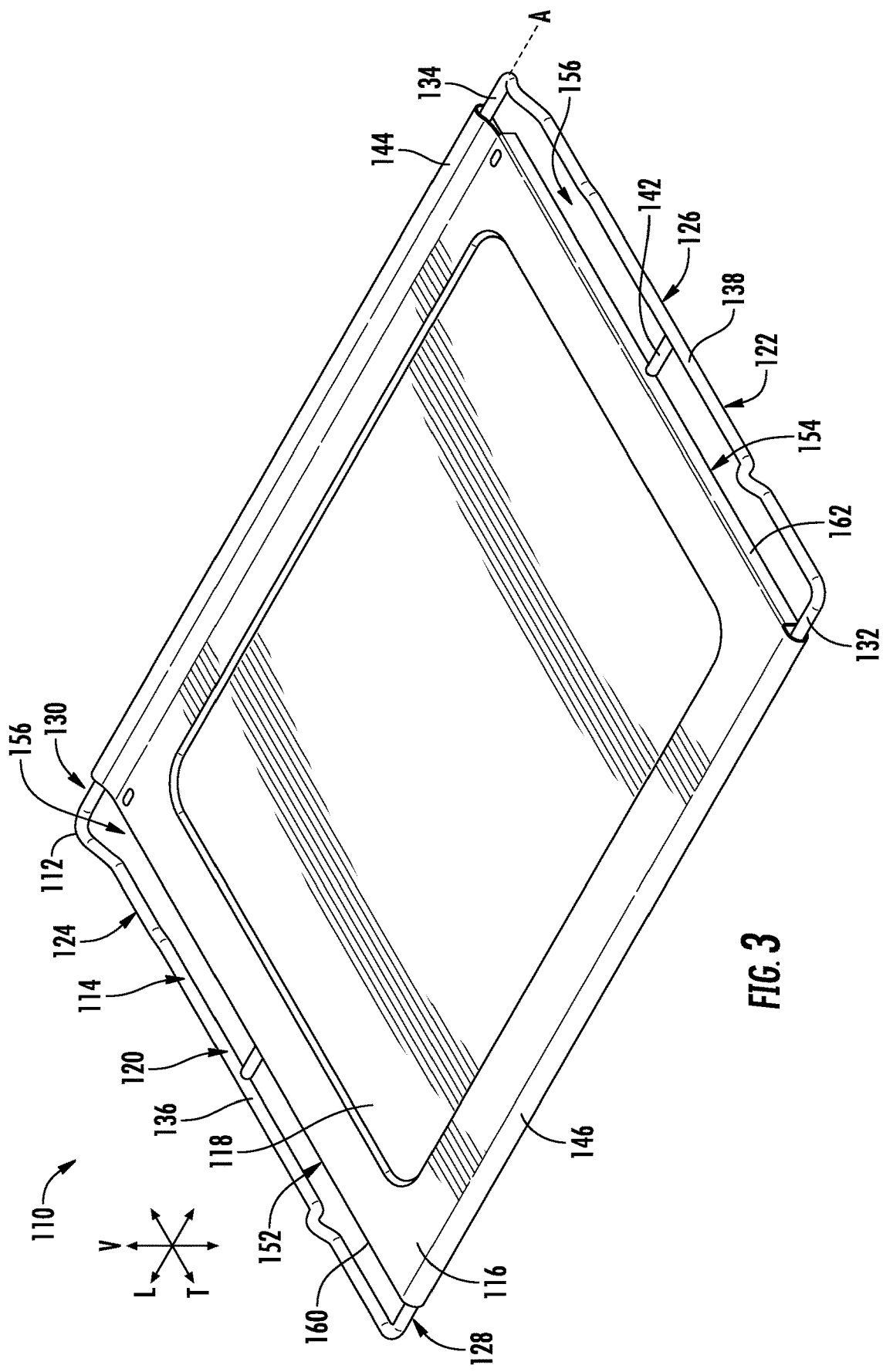
FIG. 3 provides a perspective view of a rack assembly, in isolation, of the exemplary oven appliance of FIG. 2.
Figure 4:
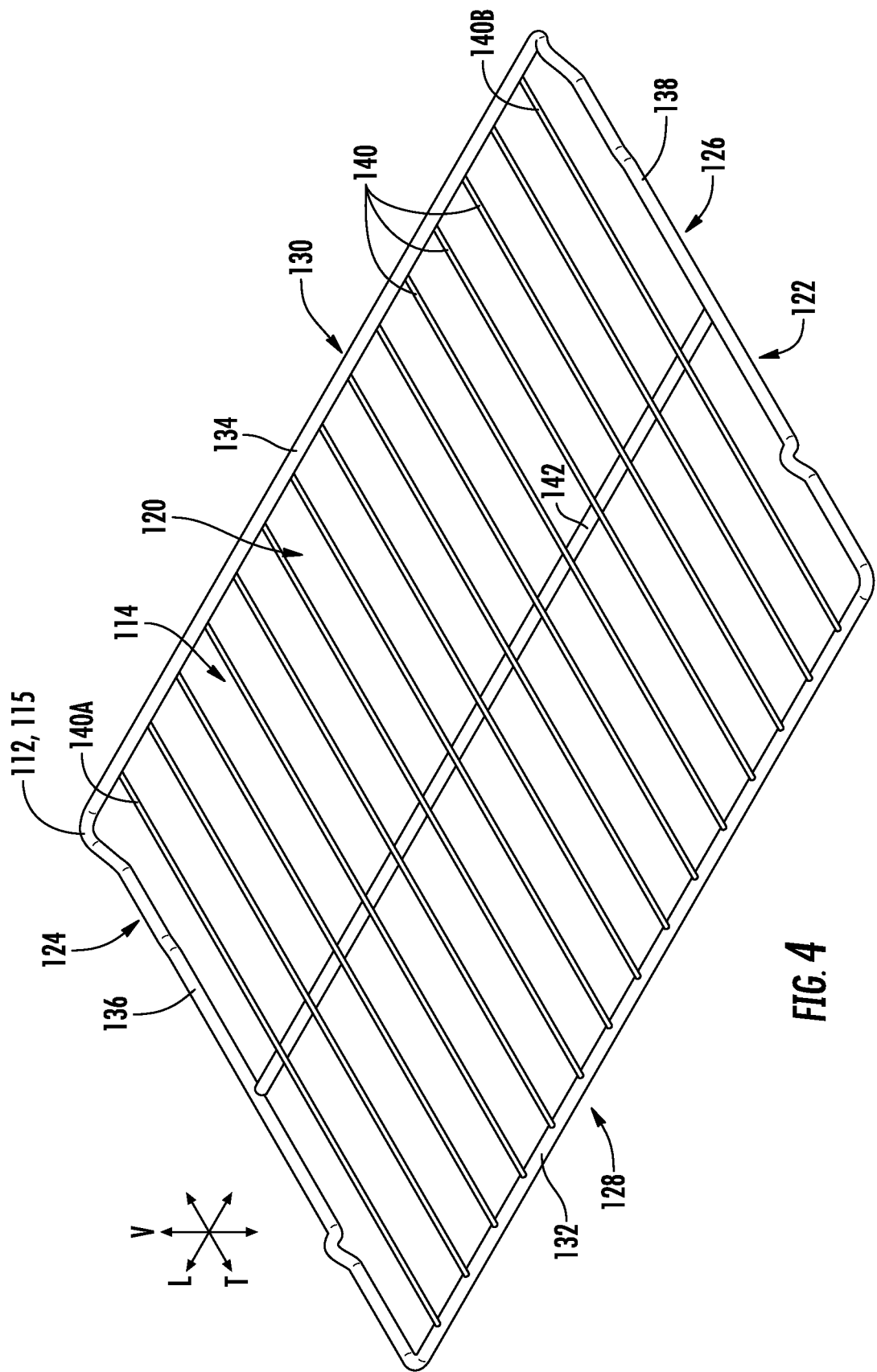
FIG. 4 provides a perspective view of a rack frame of the exemplary rack assembly of FIG. 3.

FIG. 1 provides a perspective view of an oven appliance 10 according to an exemplary embodiment of the present disclosure. FIG. 2 provides a section view of oven appliance 10 taken along the 2-2 line of FIG. 1. As shown, oven appliance 10 defines a vertical direction V, a lateral direction L and a transverse direction T. The vertical direction V, the lateral direction L and the transverse direction T are mutually perpendicular and form an orthogonal direction system. Oven appliance 10 is provided by way of example only and is not intended to limit the present subject matter in any aspect. Thus, the present subject matter may be used with other oven appliance configurations, e.g., that define one or more interior cavities for the receipt of food.

Oven appliance 10 generally includes a cooking assembly. The cooking assembly may include one or more heating elements. For example, in some embodiments, the cooking assembly, and thus the oven appliance 10 includes an insulated cabinet 12 with an interior cooking chamber 14 defined by an interior surface 15 of cabinet 12. Cooking chamber 14 is configured for the receipt of one or more food items to be cooked. Oven appliance 10 includes a door 16 rotatably mounted to cabinet 12, e.g., with a hinge (not shown). A handle 18 is mounted to door 16 and assists a user with opening and closing door 16 in order to access cooking chamber 14. For example, a user can pull on handle 18 to open or close door 16 and access cooking chamber 14.

Oven appliance 10 can include a seal (not shown) between door 16 and cabinet 12 that assists with maintaining heat and cooking fumes within cooking chamber 14 when door 16 is closed as shown in FIG. 2. Multiple parallel glass panes 22 provide for viewing the contents of cooking chamber 14 when door 16 is closed and assist with insulating cooking chamber 14. One or more rack assemblies 110 are selectively positioned or mounted in cooking chamber 14 for the receipt of food items or utensils containing food items. In some embodiments, rack assembly 110 is slidably received onto embossed ribs or sliding rails 26 such that rack assembly 110 may be conveniently moved into and out of cooking chamber 14 when door 16 is open.

A gas fueled or electric bottom heating element 40 (e.g., a gas burner, resistance heating element, CALROD, etc.) is positioned in cabinet 12 (e.g., at a bottom portion 30 of cabinet 12, directly beneath the mounted rack assembly 110). Bottom heating element 40 is used to heat cooking chamber 14 for both cooking and cleaning of oven appliance 10. The size and heat output of bottom heating element 40 can be selected based on, for example, the size of oven appliance 10. As shown, bottom heating element may be generally uncovered and, thus, exposed to the surrounding cooking chamber 14 (e.g., along the vertical direction V). In the exemplary embodiment shown in FIG. 2, top bottom heating element 40 is shown as a gas burner. However, in alternative embodiments, an electric resistance, microwave, halogen, or any other suitable heating element may be used instead of gas burner 40.

A top heating element 42 (e.g., a gas burner, resistance heating element, CALROD, etc.) may also be positioned in cooking chamber 14 of cabinet 12 (e.g., at a top portion 32 of cabinet 12). Top heating element 42 is used to heat cooking chamber 14 for both cooking/broiling and cleaning of oven appliance 10. Like bottom heating element 40, the size and heat output of top heating element 42 can be selected based on, for example, the size of oven appliance 10. In the exemplary embodiment shown in FIG. 2, top heating element 42 is shown as an electric resistance heating element. However, in alternative embodiments, a gas, microwave, halogen, or any other suitable heating element may be used instead of electric resistance heating element 42.

As shown in FIG. 2, in some embodiments, a cooling air flow passageway 28 can be provided within cabinet 12 between cooking chamber 14 and cooktop 100. For example, a portion of passageway 28 may be between cooking chamber 14 and cooktop 100 along a vertical direction V. Passageway 28 is shown schematically in the figures. As will be understood by one of skill in the art using the teachings disclosed herein, cooling air flow passageway 28 may have a variety of configurations other than as shown. Air flowing through passageway 28 can provide convective cooling.

Turning now to FIGS. 3 through 6, various views are provided of a rack assembly 110, including portions thereof, according to exemplary embodiments of the present disclosure. Generally, rack assembly 110 includes multiple discrete and separable features, including a rack frame 112 that defines a permeable support surface 114 and a non-permeable cook plate 116 that is selectively disposed on rack frame 112. Each of the discrete elements may be mutually attached to each other and subsequently separated by a user (e.g., before being attached again). Thus, and as will be described in detail below, rack assembly 110 may be selectively assembled and disassembled by a user (e.g., while maintaining at least one feature within cooking chamber 14).

Rack frame 112 and non-permeable cook plate 116 each extend along the vertical direction V, lateral direction L, and transverse direction T. Rack frame 112, in particular, extends along the vertical direction between a top surface 120 and a bottom surface 122, along the lateral direction L between a first side 124 and a second side 126, and between the transverse direction T between a front end 128 and a rear end 130. When mounted within cooking chamber 14, top surface 120 is generally directed upward (e.g., toward top heating element 42 (FIG. 2)) while bottom surface 122 is directed downward (e.g., toward bottom heating element 40 (FIG. 2)); first and second sides 124, 126 are positioned proximal to opposite sidewalls of cooking chamber 14 (e.g., on separate corresponding rails 26 (FIG. 2)); and front end 128 is positioned proximal to the door 16 (FIG. 2) or opening to cooking chamber 14 (i.e., distal to a back wall) while rear end 130 is positioned proximal to the back wall (i.e., distal to the opening to cooking chamber 14). For the purposes of this discussion, the dimensions and orientation of rack frame 112 and non-permeable cook plate 116 are described with respect to the positioning of rack assembly 110 mounted or positioned within cooking chamber 14. Nonetheless, and as noted above, rack frame 112 and non-permeable cook plate 116 are understood to be selectively separable relative to both each other and cooking chamber 14 or cabinet 12.

Rack frame 112 generally provides a permeable support surface 114 or structure (e.g., at top surface 120) onto which non-permeable cook plate 116 may be attached. In some embodiments, rack frame 112 includes a wire oven rack 115. For instance, multiple discrete wire or rail members may be provided with or as part of rack frame 112, as shown. In certain embodiments, rack frame 112 includes both a front rail 132 that extends (e.g., laterally) along the front end 128 and a rear rail 134 that extends (e.g., laterally or otherwise parallel to front rail 132) along the rear end 130. Optionally, rear rail 134 may be disposed at a higher relative height than front rail 132. In other words, rear rail 134 may be held above front rail 132 relative to the vertical direction V. In some embodiments, a left rail 136 and a right rail 138 extend (e.g., along the transverse direction T) between front rail 132 and rear rail 134. Specifically, left rail 136 and right rail 138 may extend along the first side 124 and the second side 126, respectively. In some such embodiments, left rail 136 and right rail 138 are integral with front rail 132 and rear rail 134. As a result, front rail 132, left rail 136, rear rail 134, and right rail 138 may be a continuous or monolithic unit defining a perimeter of rack frame 112.

In exemplary embodiments, rack frame 112 includes one or more intermediate rails that are held between first side 124 and second side 126. As an example, multiple intermediate longitudinal rails 140 may be provided. Generally, each of the intermediate longitudinal rails 140 may extend along the transverse direction T. The intermediate longitudinal rails 140 may be disposed parallel to each other or the left and right rails 136 and 138. The intermediate longitudinal rails 140 may be spaced apart from each other (e.g., laterally) between the first side 124 and the second side 126 (e.g., between the left rail 136 and the right rail 138). Thus, a vertical gap or gaps may be defined in the lateral spacing between adjacent intermediate longitudinal rails 140. Nonetheless, together, the intermediate longitudinal rails 140 may define the top surface 120 on which, for instance, non-permeable cook plate 116 may be supported.

As an additional or alternative example, one or more intermediate lateral rails 142 may extend (e.g., laterally) from first side 124 to second side 126. In some such embodiments, an intermediate lateral rail 142 connects left rail 136 and right rail 138. Additionally or alternatively, intermediate lateral rail 142 may connect or support one or more of the intermediate longitudinal rails 140. For instance, intermediate lateral rail 142 may extend beneath the intermediate longitudinal rails 140 (e.g., while be connected or joined to one or more of the intermediate longitudinal rails 140). As shown, intermediate lateral rail 142 may be disposed between front rail 132 and rear rail 134 (e.g., in parallel with one or both).

As noted above, rack assembly 110 may include a non-permeable cook plate 116. Non-permeable cook plate 116 generally provides a solid surface defined by an upper platform 118 that can selectively rest on the top surface 120 of rack frame 112 and receive a cooking utensil or food item (not pictured). Upper platform 118 may be formed from a relatively thin (e.g., stamped) metal, such as steel or aluminum. In some embodiments, upper platform 118 has a thickness (e.g., along the vertical direction) that is between 1 millimeter and 5 millimeters. Optionally, upper platform 118, or non-permeable cook plate 116 generally, may include a metal substrate and a surface coating (e.g., enamel coating).

Advantageously, non-permeable cook plate 116 may be easily cleaned or removed from rack frame 112. Additionally or alternatively, non-permeable cook plate 116 may readily conduct localized heat to utensils or food items thereon.

Along with an upper platform 118, non-permeable cook plate 116 includes a rear nose 144 that can be placed on or attached to rack frame 112 at rear end 130. For instance, rear nose 144 may extend arcuately and rearward from upper platform 118. As shown, rear nose 144 may be matched to the rear portion of rack frame 112. In some embodiments, rear nose 144 defines an arcuate hook 148 that is matched to rear rail 134. Thus, arcuate hook 148 may have a complementary shape or curve to the profile (e.g., cross-sectional profile) of rear rail 134. Rear rail 134 may furthermore define a rotation axis A (e.g., parallel to the lateral direction L) about which rear nose 144 may rotate (e.g., when attached to rear rail 134). In other words, rear nose 144, and non-permeable cook plate 116 generally, may rotatably attach to rear rail 134. Optionally, the arcuate hook 148 of rear nose 144 may define a radial gap 150 through which rear rail 134 may be selectively received (e.g., to selectively attach or remove non-permeable cook plate 116 from rack frame 112). Advantageously, non-permeable cook plate 116 may be selectively rotated downward onto or upward off of rack frame 112 (e.g., even when rack frame 112 is mounted or disposed within cooking chamber 14 on sliding rails 26—FIG. 2).

In certain embodiments, non-permeable cook plate 116 includes a forward nose 146 that can be placed on or attached to rack frame 112 at front end 128. For instance, forward nose 146 may extend arcuately and forward from upper platform 118. As shown, forward nose 146 may be matched to the front portion of rack frame 112. In some embodiments, forward nose 146 defines an arcuate hook 148 that is matched to front rail 132. Thus, arcuate hook 148 may have a complementary shape or curve to the profile (e.g., cross-sectional profile) of front rail 132. Optionally, the arcuate hook 148 of forward nose 146 may define a radial gap 150 through which front rail 132 may be selectively received (e.g., to selectively attach or remove non-permeable cook plate 116 from rack frame 112). In some such embodiments, the radial gap 150 of forward nose 146 is smaller than the radial gap 150 of rear nose 144 (e.g., forward nose 146 defines a smaller circumferential distance about front rail 132 than the radial gap 150 of rear nose 144 about rear rail 134). In turn, the circumferential length of rear nose 144 about rear rail 134 or rotation axis A may be smaller than the circumferential length of forward nose 146 about a front rail 132.

Generally, upper platform 118 of non-permeable cook plate 116 covers at least a portion of the top surface 120 of rack frame 112. For instance, upper platform 118, or non-permeable cook plate 116 generally, may cover the plurality of intermediate longitudinal rails 140 (e.g., each of the plurality of intermediate longitudinal rails 140) on the permeable support surface 114. Optionally, upper platform 118 may extend laterally between a first plate end 152 and a second plate end 154. When attached to rack frame 112, first plate end 152 may be disposed proximal to first side 124 (i.e., distal to second side 126) while second plate end 154 is disposed proximal to second side 126 (i.e., distal to first side 124). In exemplary embodiments, first plate end 152 is laterally spaced apart and inward from first side 124. For instance, upper platform 118 may cover the leftmost intermediate longitudinal rail 140A while leaving a vertical and lateral gap defining a side air passage 156 between first plate end 152 and first side 124. In additional or alternative embodiments, second plate end 154 is laterally spaced apart and inward from second side 126. For instance, upper platform 118 may cover the rightmost intermediate longitudinal rail 140B while leaving a vertical and lateral gap defining a side air passage 156 between second plate end 154 and second side 126.

When non-permeable cook plate 116 is attached to rack frame 112, rack assembly 110 may advantageously obscure or hide lower heating assembly 40 (FIG. 1) or the portion of cabinet 12 otherwise below rack assembly 110. Additionally or alternatively, rack assembly 110 may advantageously localize heat to upper platform 118, while permitting sufficient heat to permeate above upper platform 118 (e.g., for rapid preheating of cooking chamber 14).

In some embodiments, a bottom lip 160 or 162 extends downward from upper platform 118. As an example, a first bottom lip 160 may extend downward at first plate end 152. First bottom lip 160 may further extend in the transverse direction T, such as against one (e.g., first) intermediate longitudinal rail 140 in the transverse space between rear nose 144 and forward nose 146. Notably, first bottom lip 160 may restrict lateral movement of non-permeable cook plate 116. Optionally, first bottom lip 160 may define a rail notch 164 within which intermediate lateral rail 142 may be received, notably restricting transversal movement of non-permeable cook plate 116 on rack frame 112.

As an additional or alternative example, a second bottom lip 162 may extend downward at second plate end 154. Second bottom lip 162 may further extend in the transverse direction T, such as against one (e.g., second) intermediate longitudinal rail 140 in the transverse space between rear nose 144 and forward nose 146. Notably, second bottom lip 162 may restrict lateral movement of non-permeable cook plate 116. Optionally, second bottom lip 162 may define a rail notch 164 within which intermediate lateral rail 142 may be received, notably restricting transversal movement of non-permeable cook plate 116 on rack frame 112.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A rack assembly for an oven appliance, the rack assembly comprising:
    a rack frame extending along a transverse direction between a front end and a rear end, the rack frame defining a permeable support surface; and
    a non-permeable cook plate selectively disposed on the rack frame, the non-permeable cook plate comprising a rear nose rotatably attached to the rack frame at the rear end and a forward nose matched to the front rail and selectively disposed thereon,
    wherein the rack frame comprises a front rail extending laterally along the front end and a rear rail extending laterally along the rear end,
    wherein the rear nose defines an arcuate hook matched to the rear rail and selectively disposed thereon,
    wherein the arcuate hook of the rear nose defines a radial gap through which the rear rail is selectively received,
    wherein the forward nose comprises an arcuate hook matched to the front rail and selectively disposed thereon,
    wherein the arcuate hook of the forward nose defines a radial gap through which the front rail is selectively received, and
    wherein the radial gap of the forward nose is smaller than the radial gap of the rear nose.

2. The rack assembly of claim 1, wherein the rack frame comprises a wire oven rack.

3. The rack assembly of claim 1, wherein the rack frame extends laterally from a first side to a second side, wherein the rack frame comprises a plurality of intermediate longitudinal rails laterally spaced apart between the first side and the second side, and wherein the non-permeable cook plate covers the plurality of intermediate longitudinal rails on the permeable support surface.

4. The rack assembly of claim 1, wherein the rack frame extends laterally from a first rack side to a second rack side, wherein the non-permeable cook plate comprises an upper platform and at least one bottom lip extending downward from the upper platform.

5. The rack assembly of claim 4, wherein the rack frame comprises an intermediate lateral rail extending from the first rack side to the second rack side, and wherein the at least one bottom lip defines a rail notch within which the intermediate lateral rail is received.

6. The rack assembly of claim 4, wherein the rack frame comprises a plurality of intermediate longitudinal rails laterally spaced apart between the first rack side and the second rack side, wherein the at least one bottom lip comprises a first bottom lip and a second bottom lip, wherein the first bottom lip is disposed against a first intermediate longitudinal rail of the plurality of intermediate longitudinal rails, and wherein the second bottom lip is disposed against a second intermediate longitudinal rail of the plurality of intermediate longitudinal rails.

7. An oven appliance defining a mutually orthogonal vertical direction, lateral direction, and transverse direction, the oven appliance comprising:
- a cabinet defining a cooking chamber;
- a rack frame selectively disposed within the cooking chamber, the rack frame extending along the transverse direction between a front end disposed proximal to an opening of the cooking chamber and a rear end disposed proximal to a back wall of the cooking chamber, the rack frame defining a permeable support surface; and
- a non-permeable cook plate selectively disposed on the rack frame, the non-permeable cook plate comprising a rear nose rotatably attached to the rack frame at the rear end and a forward nose matched to the front rail and selectively disposed thereon,
- wherein the rack frame comprises a front rail extending laterally along the front end and a rear rail extending laterally along the rear end,
- wherein the rear nose defines an arcuate hook matched to the rear rail and selectively disposed thereon,
- wherein the arcuate hook of the rear nose defines a radial gap through which the rear rail is selectively received,
- wherein the forward nose comprises an arcuate hook matched to the front rail and selectively disposed thereon,
- wherein the arcuate hook of the forward nose defines a radial gap through which the front rail is selectively received, and
- wherein the radial gap of the forward nose is smaller than the radial gap of the rear nose.

8. The oven appliance of claim 7, wherein the rack frame comprises a wire oven rack.

9. The oven appliance of claim 7, wherein the rack frame extends laterally from a first side to a second side, wherein the rack frame comprises a plurality of intermediate longitudinal rails laterally spaced apart between the first side and the second side, and wherein the non-permeable cook plate covers the plurality of intermediate longitudinal rails on the permeable support surface.

10. The oven appliance of claim 7, wherein the rack frame extends laterally from a first rack side to a second rack side, wherein the non-permeable cook plate comprises an upper platform and at least one bottom lip extending downward from the upper platform.

11. The oven appliance of claim 10, wherein the rack frame comprises an intermediate lateral rail extending from the first rack side to the second rack side, and wherein the at least one bottom lip defines a rail notch within which the intermediate lateral rail is received.

12. The oven appliance of claim 10, wherein the rack frame comprises a plurality of intermediate longitudinal rails laterally spaced apart between the first rack side and the second rack side, wherein the at least one bottom lip comprises a first bottom lip and a second bottom lip, wherein the first bottom lip is disposed against a first intermediate longitudinal rail of the plurality of intermediate longitudinal rails, and wherein the second bottom lip is disposed against a second intermediate longitudinal rail of the plurality of intermediate longitudinal rails.

13. A rack assembly for an oven appliance, the rack assembly comprising:
- a rack frame extending along a transverse direction between a front end and a rear end, the rack frame defining a permeable support surface; and
- a non-permeable cook plate selectively disposed on the rack frame, the non-permeable cook plate comprising a rear nose rotatably attached to the rack frame at the front rear end and a forward nose matched to the front rail and selectively disposed thereon,
- wherein the rack frame comprises a front rail extending laterally along the front end and a rear rail extending laterally along the rear end,
- wherein the rear nose defines an arcuate hook matched to the rear rail and selectively disposed thereon,
- wherein the forward nose comprises an arcuate hook matched to the front rail and selectively disposed thereon, and
- wherein a circumferential length of the rear nose about the rear rail is smaller than the a circumferential length of the forward nose about the front rail.

14. The rack assembly of claim 13, wherein the rack frame extends laterally from a first side to a second side, wherein the rack frame comprises a plurality of intermediate longitudinal rails laterally spaced apart between the first side and the second side, and wherein the non-permeable cook plate covers the plurality of intermediate longitudinal rails on the permeable support surface.

15. The rack assembly of claim 13, wherein the rack frame extends laterally from a first rack side to a second rack side, wherein the non-permeable cook plate comprises an upper platform and at least one bottom lip extending downward from the upper platform.

16. The rack assembly of claim 15, wherein the rack frame comprises an intermediate lateral rail extending from the first rack side to the second rack side, and wherein the at least one bottom lip defines a rail notch within which the intermediate lateral rail is received.

17. The rack assembly of claim 15, wherein the rack frame comprises a plurality of intermediate longitudinal rails laterally spaced apart between the first rack side and the second rack side, wherein the at least one bottom lip comprises a first bottom lip and a second bottom lip, wherein the first bottom lip is disposed against a first intermediate longitudinal rail of the plurality of intermediate longitudinal rails, and wherein the second bottom lip is disposed against a second intermediate longitudinal rail of the plurality of intermediate longitudinal rails.

18. The rack assembly of claim 13, wherein the rack frame comprises a wire oven rack.

* * * * *